(12) United States Patent
Akiba et al.

(10) Patent No.: US 6,266,913 B1
(45) Date of Patent: Jul. 31, 2001

(54) INTRA-LINE FISHING ROD WITH FISHING LINE GUIDE MEMBERS

(75) Inventors: Masaru Akiba, Saitama; Shuichi Kimura; Kouichi Ito, both of Tokyo; Tomoyoshi Tsurufuji, Saitama, all of (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 08/360,633

(22) Filed: Dec. 21, 1994

(30) Foreign Application Priority Data

Dec. 22, 1993 (JP) .................................. 5-346207
Feb. 15, 1994 (JP) .................................. 6-040484

(51) Int. Cl.$^7$ ................................................ A01K 87/04
(52) U.S. Cl. .................................. 43/24; 43/18.1
(58) Field of Search .......................... 43/18.1, 24

(56) References Cited

U.S. PATENT DOCUMENTS

| 2,777,239 | * | 1/1957 | Cushman | 43/24 |
| 3,432,958 | * | 3/1969 | Bellinger | 43/24 |

FOREIGN PATENT DOCUMENTS

| 249360 | * | 8/1963 | (AU) | 43/24 |
| 2641269 | * | 3/1978 | (DE) | 43/24 |
| 3246801 | * | 6/1984 | (DE) | 43/24 |
| 1374960 | * | 9/1964 | (FR) | 43/24 |
| 1385014 | * | 11/1964 | (FR) | 43/24 |
| 1541807 |   | 9/1968 | (FR) . | |
| 1541807 |   | 10/1968 | (FR) . | |
| 2029828 |   | 10/1970 | (FR) . | |
| 146755 | * | 7/1920 | (GB) | 43/24 |
| 1209513 | * | 10/1970 | (GB) | 43/18.5 |
| 1526581 |   | 9/1978 | (GB) . | |
| 1526582 | * | 9/1978 | (GB) | 43/24 |
| 56-127032 |   | 10/1981 | (JP) . | |

* cited by examiner

*Primary Examiner*—Kurt Rowan
(74) *Attorney, Agent, or Firm*—Liniak, Berenato, Longacre & White

(57) ABSTRACT

The present disclosure concerns an intra-line fishing rod with at least one fishing line guide member inserted therein. According to the present invention, maintenance of fishing line guide members is facilitated. Support members S1,S2, S3,S4 are mounted inside a rod pipe while respectively supporting fishing line guide members G1,G2,G3,G4 which allow a fishing line to slide smoothly therethrough. The support members and fishing line guide members are positioned and removably mounted inside the rod pipe.

15 Claims, 6 Drawing Sheets

INTRA-LINE FISHING ROD WITH FISHING LINE GUIDE MEMBERS

BACKGROUND OF THE INVENTION a) Field of the Invention

The invention concerns the support of fishing line guide members for an intra-line fishing rod of either the single or multiple element type.

b) Description of Related Art

Japanese Patent Publication No. 56-127032 to Showa discloses an intra-line fishing rod in which a plurality of fishing line guide members are secured to the inner surface of a rod pipe by pressure or other means of bonding. The guide members are included to reduce the resistance to the passage of a fishing line through the fishing rod.

A disadvantage of the above-mentioned conventional fishing rod is that any of the fishing line guide members can come off from the inner surface of the rod pipe due to flexing of the fishing rod or the like. If the fishing rod is used with one or more guide members detached, a number of problems may arise including producing unacceptable noise, increased resistance and wear on the fishing line, and an increased likelihood the fishing line will break.

To repair an intermediate fishing line guide member which has become detached, the remaining members fixed to the inner surface of the rod pipe between the end of the rod pipe and the detached member must be removed to gain access to the detached member. Each member must thereafter be relocated and secured again, which is both troublesome and inconvenient.

Also, dust or the like is apt to collect between the fishing line guide members. In order to clean out the dust or the like from the conventional fishing rod, it is similarly necessary to remove and reattach the members, which is very troublesome.

SUMMARY OF THE INVENTION

An object of the present invention is to provide an intra-line fishing rod having at least one fishing line guide member disposed therein, and which is capable of facilitating the maintenance of the fishing line guide member(s) and associated elements disposed inside the rod pipe.

Another object of the invention to provide an improved structure for taking out fishing line guide members from the rod pipe and mounting them again after completing maintenance.

A first type of fishing rod according to the present invention includes fishing line guide members which reduce the resistance on a fishing line but are not attached to the inside of an intra-line rod pipe. The fishing line guide members are accessed by removing a tubular or semi-tubular support member which is mounted in the rod pipe and which supports the fishing line guide members. This facilitates maintenance of the fishing line guide members such as cleaning, repair and replacement, as well as the cleaning of the inner peripheral surface of the rod pipe.

Inasmuch as the fishing line guide member(s) in the first type of fishing rod are supported by the support member inside the rod pipe, the position of each fishing line guide member is restricted by the support member. This prevents the fishing line guide member(s) from becoming detached, even when the rod pipe is flexed. Also, because the support member and fishing line guide member(s) may be removably mounted together, this further facilitates their repair and cleaning.

A second type of fishing rod according to the present invention includes a support member having at least two longitudinally extending rods maintaining the position of at least one fishing line guide member therebetween. A fishing line guide member is attached to each rod. The rods mutually form the support member which has an end adjacent an end portion of the rod pipe such that when the support member is extracted by its end, all of the fishing line guide members are removed concurrently. As in the first type of fishing rod, this arrangement facilitates the maintenance of the rod pipe and the guide member(s).

DESCRIPTION OF THE PREFERRED EMBODIMENT

Figure 1:
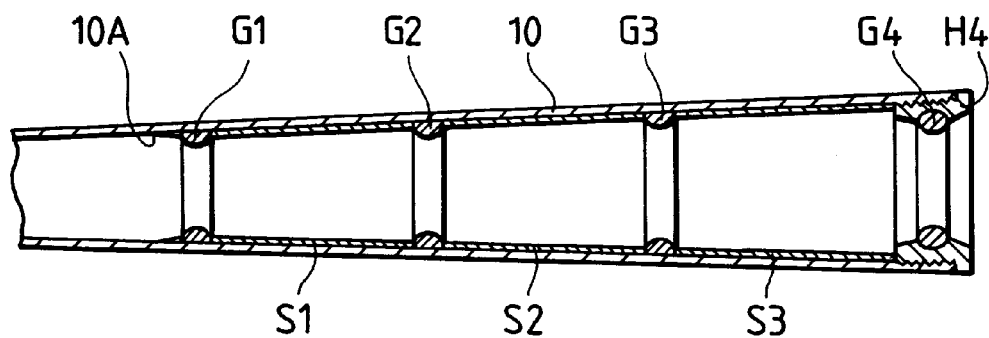
FIG. 1 is a partial longitudinal section view of a first embodiment of a fishing rod according to the invention.

FIG. 1 shows a rod pipe 10 which may be formed of a fiber reinforced prepreg or the like in a tapering middle section of a fishing rod. Inside the rod pipe 10, there are disposed four fishing line guide members G1,G2,G3,G4. Each of the fishing line guide members G1,G2,G3,G4 has a wear resistant property and may be formed of a ceramic material which allows a fishing line to slide smoothly. As shown, each fishing line guide member G1,G2,G3,G4 is formed with a different outside diameter dimension value.

If the respective fishing line guide members G1,G2,G3, G4 are inserted into the rod pipe 10 from the larger diameter, rear portion thereof, then the guide members can be stopped at their respective given positions. In particular, the guide member G1 is inserted and is stopped at a given position in relation to its outside diameter. To avoid an error with respect to this position, a stopper portion 10A may be formed on the inner surface of the rod pipe 10.

Next, a cylindrical sleeve S1 having a given length is inserted as a support member. Another fishing line guide member G2 is inserted after the sleeve S1, and is abutted against the rear end of the sleeve S1. Similarly, the sleeves S2 and S3, as well as the fishing line guide member G3 are inserted.

The last fishing line guide member G4 is held in place by a guide hold member H4 which includes an external threaded portion formed on the outer periphery thereof. That is, the external threaded portion is threadably engaged with an internal thread portion formed in the rear end portion of the rod pipe 10, thereby holding the respective sleeves S1,S2,S3 and fishing line guide members G1,G2,G3,G4 within the rod pipe 10. The respective sleeves S1,S2,S3 are formed such that their wall thickness is smaller than the radial dimension of the adjacent fishing line guide members G1,G2,G3,G4. Preferably, the sleeves S1,S2,S3 may be formed of a relatively flexible material such as a resin material which does not substantially influence the flexing property of the rod pipe 10. Alternatively, the sleeves S1,S2,S3 may be formed of a fiber reinforced prepreg or the like using a carbon fiber in which high-strength fibers are predominately oriented in the circumferential direction thereof.

Thus, a fishing line can be guided by the fishing line guide members G1,G2,G3,G4 to allow the fishing line to slide smoothly through the rod pipe 10, thereby reducing the resistance on the fishing line. Maintaining the fishing line guide members G1,G2,G3,G4, including cleaning and making repairs thereto, is readily accomplished by removing the guide hold member H4 provided in the rear-most portion of the rod pipe 10. The sleeves S1,S2,S3 and fishing line guide members G1,G2,G3,G4 can be respectively taken out from the rear portion of the rod pipe 10, and re-inserted again after completion of the cleaning or repairing operation. Also, it is possible to replace only a portion of the fishing line guide members G1,G2,G3,G4 and thus the whole of the rod pipe 10 need not be replaced. In addition, different numbers and types of fishing line guide members G1,G2,G3,G4 can be used with a given rod pipe 10 depending on the weather conditions and the kind of fishing line being used.

If there is an undesirable clearance between the rod pipe 10 and the respective sleeves S1,S2,S3 or fishing line guide members G1,G2,G3,G4 due to dimensional errors in manufacture along the longitudinal direction thereof, a coil spring or the like may also be interposed between the sleeve S3 and hold member H4. Also, looseness in the radial direction, which tends to produce a rattling noise, may be addressed by coating the outer surfaces with an elastic material such as rubber or the like to fill up the clearance. A material which is sticky to some degree may be coated on the outer surface of the sleeves S1,S2,S3, or a resin film may be bonded to the outer surfaces.

Because the size of the fishing line guide members G1,G2,G3 may render them difficult to insert into the rod pipe 10, the respective fishing line guide members G1,G2, G3 may be held by a hold member similar to hold member H4.

Figure 2:
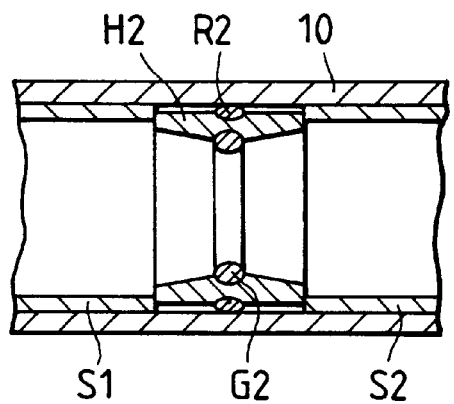
FIG. 2 is a longitudinal section view of the main portions of a variation of a fishing rod according to the first embodiment.

As shown in FIG. 2, there can be produced a gap in the radial direction between the outer peripheral surface of a hold member H2 or the like and the inner peripheral surface of the rod pipe 10, with the result that the fishing line guide members G1,G2,G3 can be loose while the fishing rod is in use. In order to prevent this, an elastic member such as an O ring R2 or the like may be inserted onto the outer peripheral surface of the hold member H2 or the like.

Figure 3:
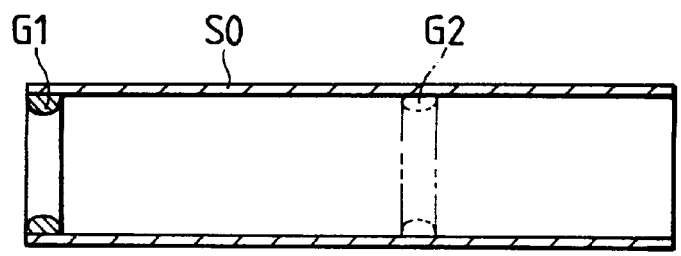
FIG. 3 is a longitudinal section view of the main portions of a variation of a fishing rod according to the first embodiment.

As shown in FIG. 3, to improve the ease of insertion and removal of a fishing line guide member G1, it may be mounted on the inner peripheral surface of a sleeve S0 or the like before it is inserted into and removed from the rod pipe 10. Also, this simplifies maintenance insofar as by simply pulling out the sleeve S0, the fishing line guide member G1 is also removed. However, for cleaning of the fishing line guide member G1, it is preferably mounted on the leading end portion of the sleeve S0.

To further ease the insertion and removal operation, not only the fishing line guide member G1 may be mounted on the leading end portion of the sleeve S0, but also the fishing line guide member G2 or the like may be mounted on the inner surface of a longer sleeve. If this makes it difficult to clean the fishing line guide member G2 or the like mounted within such a long sleeve, then such fishing line guide members G1,G2 and sleeve S0 may be replaced together. Alternatively, if only the sleeve S0 is to be replaced, the fishing line guide member G1 may be separated from the sleeve S0 before it is cleaned. When a plurality of fishing line guide members are mounted within a long cylindrical sleeve S0, a great deal of time and labor can be saved by inserting or removing the entire combination. This also tends to eliminate the possibility that the combination can become loose in the longitudinal direction during fishing.

Figure 4:
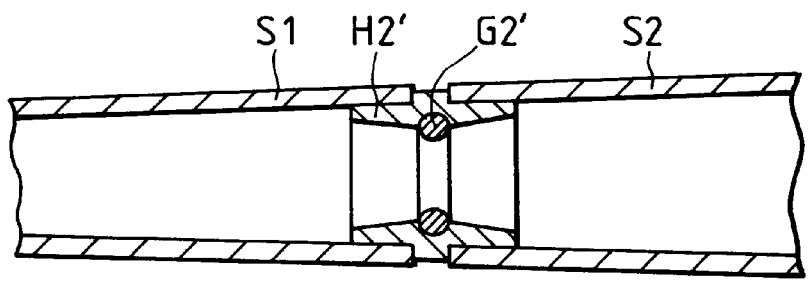
FIG. 4 is a longitudinal section view of the main portions of a variation of a fishing rod according to the first embodiment.

FIG. 4 shows one method for solving the aforementioned drawback in which a plurality of fishing line guide members are to be mounted in a long sleeve. Specifically, sleeves S1,S2 are detachably connected with each other through a hold member H2' secured to a fishing line guide member G2'. The manner of connecting is not limited to the manner shown in FIG. 4. For example, the end portion of the sleeve S2 may be overlapped on and connected to the end portion of the sleeve S1. When such a fishing line guide member G2' is removably mounted on the sleeves S1,S2, the sleeves S1,S2 and fishing line guide member G2' can be inserted and removed easily. Also, when a respective fishing line guide member G2' is cleaned or replaced after being taken out from the rod pipe 10, the sleeves S1,S2 may be broken down and taken out, which eliminates the need to waste the sleeves S1,S2 and the like.

Figure 5:
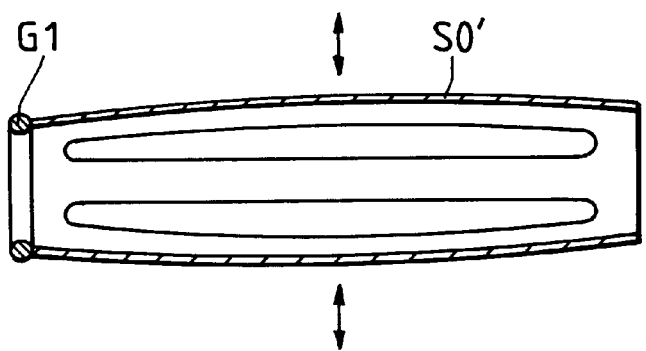
FIG. 5 is a longitudinal section view of the main portions of a variation of a fishing rod according to the first embodiment.

Errors in manufacturing the fishing line guide members G1,G2,G3 and support members H2,H2' may produced clearances between these members and the inner surface of the rod pipe 10 in the radial direction. As shown in FIG. 2, the fishing line guide member G2 is prevented from becoming loose, but the sleeves S1,S2 can become loose. To prevent this, a cylindrical support member S0' as shown in FIG. 5 may be used which has a radially directed resilient property. For example, the member S0' may be formed in a barrel shape. A fishing line guide member G1 is mounted at or near an end of the barrel member S0'. One or more such assemblies may be inserted into the rod pipe 10 such that they closely contact the inner surface of the rod pipe 10 due to the resilient deformation of the barrel-shaped members S0'. This stabilizes the mounting of the assemblies and also prevents them from becoming loose.

Figure 6:
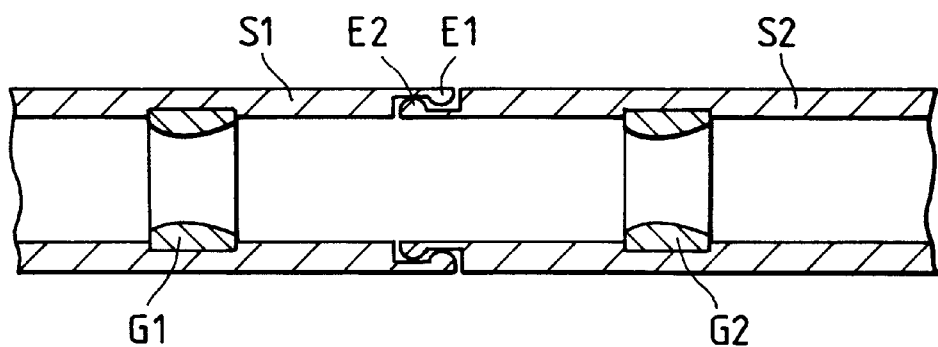
FIG. 6 is a perspective view of the main portions of a variation of a fishing rod according to the first embodiment.

FIG. 6 shows an embodiment of the present invention in which a plurality of separate support member elements S1,S2, . . . are sequentially arranged in the longitudinal direction and connected with one another to form the entire support member. An inner peripheral surface of one end portion E1 of a support member element S1 is engaged with an end portion E2 of a support member element S2 adjacent to the element S1. The end portions E1,E2 can freely rotate with respect to each other so that even if the support member element located in the rear end portion of the support member is rotated, the remaining support member elements do not necessarily rotate. If the support member is formed of an elastic member such as a silicone tube or the like, when the support member is taken out from the rod pipe, the support member can be separated into the respective support member elements, which facilitates the maintenance such as cleaning or the like of the fishing line guide members G1,G2, . . . supported within the respective support member elements.

The method of connecting the support member elements S1,S2, . . . with one another is not limited to the above-mentioned method. Alternatively, the support member elements S1,S2, . . . can be connected by screws or pins which still permits the support member to be broken down into its elements.

Figure 7:
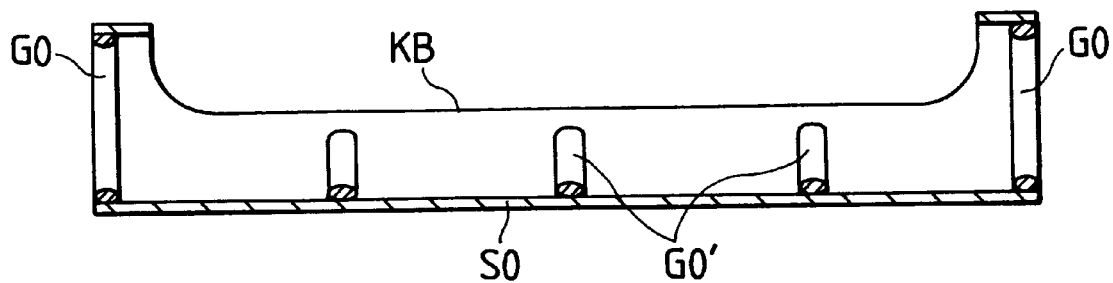
FIG. 7 is a longitudinal section view of the main portions of a second embodiment of a fishing rod according to the invention.

However, when a plurality of fishing line guide members are mounted on the long sleeve, it is not easy to clean the fishing line guide members. FIG. 7 shows one method for solving this problem. In particular, the intermediate portion of the cylindrical sleeve S0, i.e. between the two end portions, is formed in a semi-cylindrical open portion KB. Circular fishing line guide members G0,G0 are mounted in the two ends of the sleeve S0, and semi-circular fishing line guide members G0',G0' are mounted in the open portion KB. During fishing, the semi-circular fishing line guide members G0',G0' are oriented so as to be disposed along the bottom side of the sleeve. Therefore, it is preferable to include "up" and "down" markings on the outer surface of the rod pipe 10. This structure can save the time and labor required to insert and remove the sleeve S0 as described above, and can also prevent the sleeve and the fishing line guide members from becoming loose in the longitudinal direction of the rod pipe 10. The existence of the open portion KB facilitates the cleaning of the fishing line guide members G0',G0' inserted within the rod pipe 10.

Figure 8:
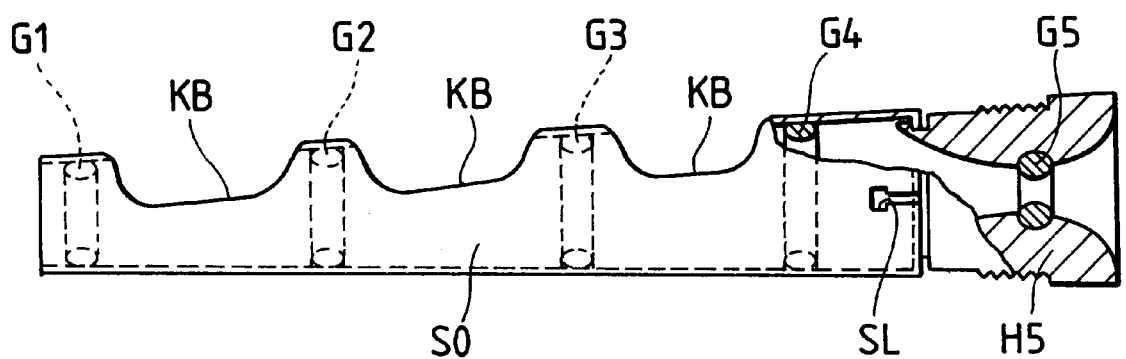
FIG. 8 is a longitudinal section view of the main portions of a variation of a fishing rod according to the second embodiment.

As noted previously, a support member including a plurality of fishing line guide members may be formed in a cylindrical shape or in a semi-cylindrical shape. FIG. 8 shows an embodiment of the present invention similar to that shown in FIGS. 3 and 7, in which a support member S0 is formed as a combination of cylindrical and semi-cylindrical cross-sections, and supports a plurality of fishing line guide members G1,G2,G3,G4,G5. As will be described further with respect to FIGS. 10 and 11, the rear end portion of a support member S0 is secured to a recessed portion formed in a hold member H5 to thereby prevent the support member S0 from being removed from the rod pipe 10, and the support member S0 and hold member H5 freely rotate with respect to one another. Also, since the support member S0 includes a split SL in the rear portion thereof, the end of the support member S0 may be expanded and separated from each other after being removed from the rod pipe.

The support member S0 includes open portions KB in the upper surface thereof on either side of the respective fishing line guide members G2,G3. After the support member S0 is taken out from the rod pipe, the open portions KB facilitate maintenance such as cleaning and the like of the respective fishing line guide members G1,G2,G3,G4. The support member S0 may be formed of an elastic member and includes annular grooves at given positions along the inner periphery thereof for holding the fishing line guide members G1,G2,G3,G4. The fishing line guide members G1,G2,G3,G4 can therefore be easily replaced if they become worn. The fishing line guide members G1,G2,G3,G4 may include external threaded portions on the outer peripheral surface thereof and the support member S0 may include internal threaded portions corresponding to the external threaded portions of the respective fishing line guide members G1,G2,G3,G4 at the desired longitudinal positions. This also facilitates replacing and securely holding the fishing line guide members G1,G2,G3,G4. Further, mutually engaging portions may be formed on both the respective fishing line guide members and support member, which also facilitates easy replacement of the fishing line guide members.

The support member S0 may also include a plurality of longitudinally adjacent engaging portions, such as grooves or the like, which selectively receive a particular fishing line guide member. Therefore a particularly desirable longitudinal position may be selected for each fishing line guide so as to minimize resistance on the fishing line in view of the fishing conditions. Further, undesirable flexing of the fishing rod can be prevented, and the overall strength of the fishing rod may be increased, based on the axial positioning of the fishing line guide member(s) and the angular orientation of the support member S0 with respect to the rod pipe 10.

The above-mentioned cylindrical support member S0 may also include a flexible film layer coated on the outer peripheral surface thereof such that clearance in the radial direction of the support member S0 can be filled when the support member S0 is inserted into the rod pipe, thereby preventing the support member from becoming loose. Also, the outside diameter dimension of the rear end portion of the support member S0 may be arbitrarily enlarged such that upon inserting the support member S0 into the rod pipe 10, the split SL enables the support member S0 to be contracted. After insertion, the support member S0 expands to press against the inner surface of the rod pipe 10, thereby preventing the support member from becoming loose in the radial direction. Further, if fluorine resin is coated onto the inner surface of the rod pipe, friction resistance is reduced even when the fishing line contacts the inner surface, and since the fluorine resin repels water to a high degree, water within the rod pipe 10 can be easily discharged.

Figure 9:
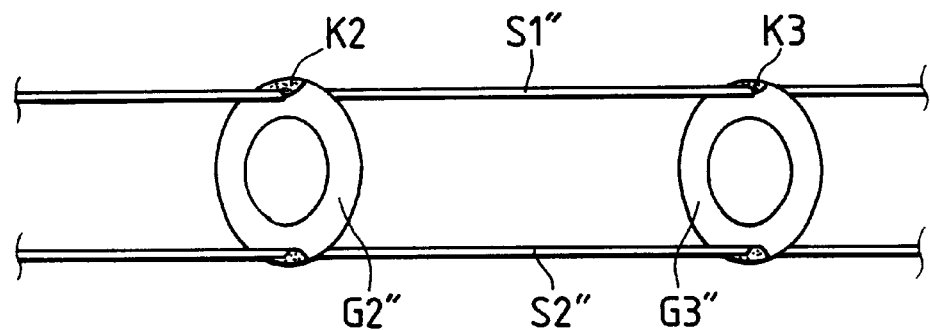
FIG. 9 is a perspective view of the main portions of a third embodiment of a fishing rod according to the invention.

FIG. 9 shows another embodiment of the present invention in which an elongated rod members S1",S2" formed of metal or the like are used instead of the cylindrical sleeve S0,S1,S2. The rods S1",S2" serve as a holder for fishing line guide members G2",G3" and are supported by, and fixed to the rods S1",S2" through fixing portions K2,K3. The thus obtained assembly is inserted into a rod pipe 10 in such a manner that the respective fishing line guide members G2",G3" can be pressure inserted against the inner surface of the rod pipe 10. In this manner, the respective fishing line guide members G2",G3" are positioned within the rod pipe 10. In terms of maintenance, if the rods S1",S2" are taken out from the rod pipe 10, then the associated fishing line guide members G2",G3" are concurrently removed from the rod pipe 10.

In each of the above embodiments, a film allowing the fishing line to slide smoothly may be coated on the inner surface of the fishing line guide members, and two or more such fishing line guide members may be inserted in series into a rod pipe to thereby reduce the resistance on the fishing line. During maintenance, such as cleaning and the like, the fishing line guide members may be taken out from the rod pipe and the coated film (e.g a fluorine film, a silicone film or the like which have a high water repellent property) replenished so that it allows the fishing line to slide smoothly and concomitantly facilitates the removal of water drops which are drawn into the rod pipe.

Also, the inner surfaces of the fishing line guide members may be formed with an irregular cross-section such that wax may be stored in a recessed portion on the inner surface of the fishing line guide members. In this case as well, the fishing line guide members may be removed from the rod pipe to replenish the wax, and thereafter re-inserted into the rod pipe.

Figure 10:
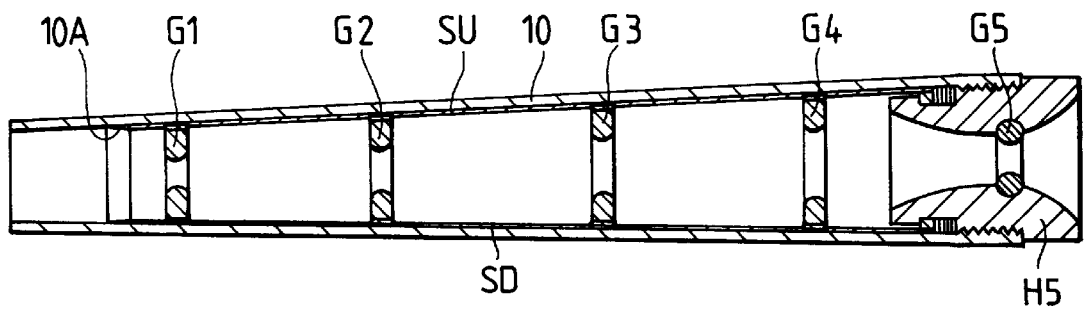
FIG. 10 is a partially longitudinal section view of a variation of a fishing rod according to the third embodiment.
Figure 11:
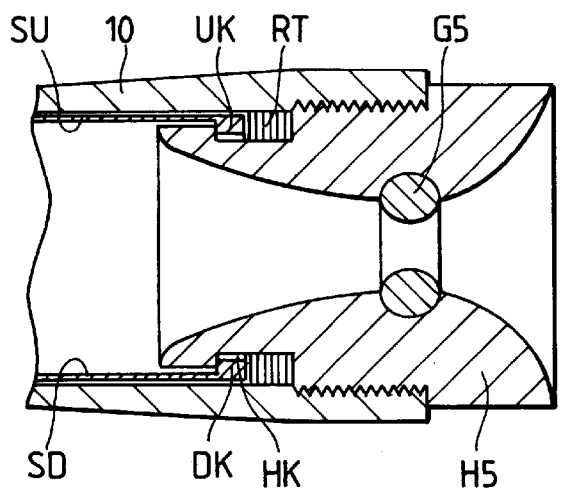
FIG. 11 is an enlarged longitudinal section view of one aspect of the fishing rod shown in FIG. 10.
Figure 12:
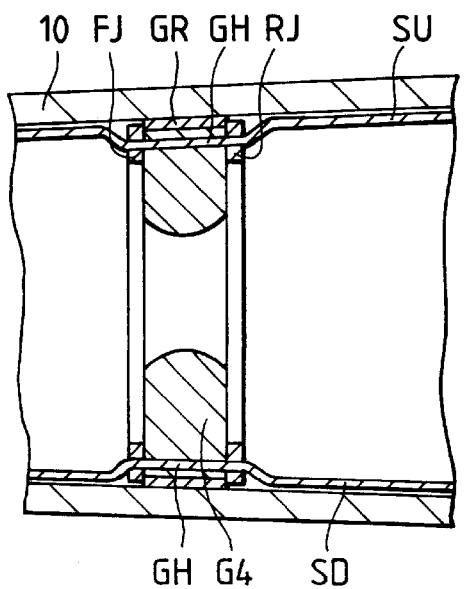
FIG. 12 is an enlarged longitudinal section view of one aspect of the fishing rod shown in FIG. 10.

Now, referring to FIGS. 10–12, there is shown a particular embodiment of the present invention in which an upper support member SU and a lower support member SD are used to support fishing line guide members G1,G2,G3,G4 formed out of a ceramic material. The position of the front end of the upper and lower support members SU,SD may be restricted by a stopper portion 10A formed or mounted at a given position in the rod pipe 10, similar to the embodiment shown in FIG. 1. The stopper portion 10A projects into the rod pipe 10 and may be formed of an elastic material.

As shown in FIG. 11, the rear end of the support member includes a fishing line guide member G5 which may be made of a ceramic material. The fishing line guide member G5 is secured and held by a hold member H5 which is threadably connected to the rear end portion of the rod pipe 10. The hold member H5 includes a recessed portion HK circumscribing the outer periphery at the forward position of the hold member H5. The recessed portion HK receives a projection UK off the rear portion of the upper support member SU and a projection DK off the rear end portion of the lower support member SD in such a manner that the projections UK,DK can rotate with respect to the hold member H5. Also fitted into the recessed portion HK is an adjustment member RT forming a resilient element. The adjustment member RT pushes against the support member elastically so as to adjust the position of the support members SU,SD in the longitudinal direction thereof, and also pushes the respective fishing line guide members G1,G2, G3,G4 to thereby eliminate clearance and play. The projections UK,DK of the respective support members SU,SD can be expanded with respect to the recessed portion HK when the hold member H5 is not threadably connected with the rod pipe 10, whereas the projections UK,DK cannot be removed when the hold member H5 is threadably connected with the rod pipe 10.

Because the projections UK,DK are engaged with the recessed portion HK, and the hold member H5 is threadably engaged with the rod pipe 10, when the hold member H5 is rotated, the projections UK,DK of the support members SU,SD are pushed forward by the adjustment member RT. Thus the front end portions of the support members SU,SD are abutted against the stopper portion 10A of the rod pipe 10, and the fishing line guide members G1,G2,G3,G4 are supported at given positions.

The mounting of the hold member H5 onto the rod pipe 10 is achieved by means of the threaded engagement. Alternatively, the hold member H5 may be pressure inserted into the rod pipe 10 such that at least one knurled portion causes engagement therebetween, or it may be simply pressure inserted and fitted into the rod pipe. The hold member H5 may be formed of a ceramic material so that it can also serve as the fishing line guide member G5, or just the threaded portion of the hold member may be formed of metal.

The hold member H5 may be connected to the support members SU,SD on the outer periphery of the hold member H5 as illustrated in FIGS. 10–12, or the support members SU,SD may be secured to the inner periphery of the hold member H5. The adjustment member RT may be an elastic member such as a coil spring or the like interposed between the hold member H5 and support members SU,SD to thereby adjust clearances between them in the longitudinal direction of the fishing rod.

As shown in FIG. 12 in an enlarged manner, the fishing line guide member G4 or the like includes two holes GH,GH formed in the peripheral portion thereof. The upper and lower support members SU,SD are respectively inserted through the holes GH,GH and are bent before and after the holes GH,GH in a manner to extend along the rod pipe 10, thereby maintaining the position of the fishing line guide member G4. The support members SU,SD may be in contact with the inner surface of the rod pipe 10 or a clearance may exist between them. If the clearance exists, a film may be coated on the support members SU,SD to prevent the generation of undesirable noise due to contact between the support members SU,SD and the inner surface of rod pipe 10. Also, in order to reduce the resistance on the fishing line when it is inserted, a film allowing the line to slide well may be coated on the support members SU,SD.

Annular rings FJ,RJ each formed of a rubber plate or the like may be also disposed on either side of the fishing line guide member G4. The upper and lower support members SU,SD are also inserted the annular rings FJ,RJ. The annular rings FJ,RJ hold the fishing line guide member G4 elastically from in front and behind by virtue of the bends in the upper and lower support members SU,SD.

Also, the fishing line guide member G4 or the like may include on the outer surface thereof a film coating GR which may be formed of synthetic resin, rubber or the like such that it demonstrates an elastic characteristic. Therefore, when a plurality of fishing line guide members are supported by the support members SU,SD and are inserted into and supported in the rod pipe 10, the film GR can absorb clearances and play caused by differences in dimension between the respective fishing line guide members and the inside diameters of the rod pipe at the respective positions of the fishing line guide members. Also, the elasticity of the annular rings FJ,RJ makes it possible to slightly adjust the longitudinal positions of the fishing line guide members G4 and the like within the rod pipe 10, so as to absorb clearances and play.

In the above description, the support members SU,SD consist of two support members, namely, upper SU and lower SD support members, alternatively, the support members may comprise three or more elongated members.

Also, the support members are not required to be disposed substantially parallel to one another, but instead may form a spiral element(s). Further, the fishing line guide member(s) and support members may be formed integrally with each other in a spiral configuration.

Figure 13:
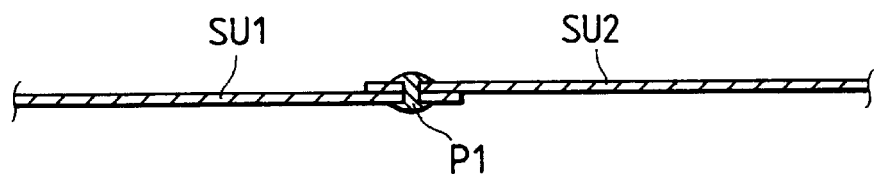
FIG. 13 is a longitudinal section view of the main portions of a variation of a fishing rod according to the third embodiment.

FIG. 13 shows a structure which makes it possible to fold a support member removed from the rod pipe 10 while the support member elements SU1,SU2 remain connected with one another. In particular, an upper support member SU such as that shown in FIG. 10 is divided into elements SU1,SU2. These elements are pivotally connected with one another by a pin member P1 or the like, and the lower support member SD is similarly constructed so that the entire support member can be folded. Alternatively, a flexible member may connect the elements of the support member holding the fishing line guide members, so that the support member can be folded. Here, the term "flexible member" includes not only an elastic member such as elastomer resin represented by rubber, but also a chain-like connecting member. In this case, hold means may be provided on the leading end portion of the rod pipe and the support member may be fixed to and extended from the hold means.

Figure 14:
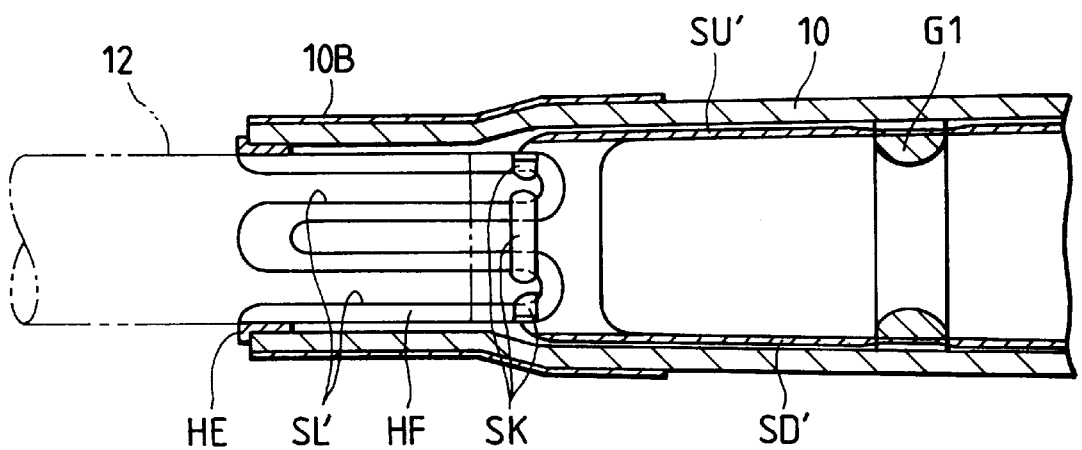
FIG. 14 is a longitudinal section view of the main portions of a variation of a fishing rod according to the third embodiment.

Referring now to FIG. 14, a plug member HF serves as hold means for holding the rod pipe 10 and is mounted onto the leading end portion of the rod pipe 10. The plug member HF is connected to the leading end portion SK of the support member which is divided into upper SU' and lower SD' support portions. Therefore, the support portions SU',SD' hold the fishing line guide member G1 and concurrently are secured to the plug member HF such that the support member is fixed to and extends from the plug member HF. The rear end portion of the rod pipe 10 is secured by use of a hold member H5 such as that shown in FIG. 11 or the like.

To support the fishing line guide member G1, the upper and lower support portions SU',SD' are squeezed and inserted tightly into holes formed through the fishing line guide member G1 to thereby position and hold the fishing line guide member G1. The plug member HF includes slits SL' which are elongated in the longitudinal direction thereof, and thus the plug member HF is divided into a plurality of (e.g. four) sub-sections. Also, the plug member HF includes a securing portion HE at the leading end portion thereof. This structure allows the plug member HF to be expanded and contracted in the radial direction thereof within the rod pipe 10. To secure the plug member HF to the leading end portion of the support member, the plug member HF is inserted into the rod pipe 10 from the rear end thereof. To remove the plug member HF, a suitable rod member pulls the plug member HF from the front end portion of the rod pipe 10 while it remains contracted. During replacement, after the securing portion HE of plug member HF is secured to the leading end face of the rod pipe 10, the support member can be fixed to and extended from the plug member HF.

Reference character 10B in FIG. 14 designates a reinforcing layer or a reinforcing ring provided on the leading end portion of the rod pipe 10. The layer or ring 10B reinforces the leading end portion of the rod pipe 10 with respect to the expanding action of the plug member HF. Also, reference character 12 indicates an adjoining rod pipe which may be connected to the pipe rod 10 via the inner surface of the plug member HF. In particular, this illustrates that interference in the connecting operation of adjoining rod pipes 10,12 can be avoided even when the plug member HF is provided.

Figure 17:
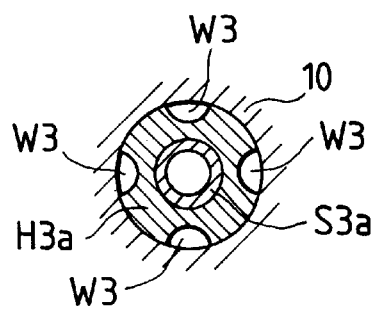
FIG. 17 is a cross-sectional view taken along line 17—17 of FIG. 16.
Figure 15:
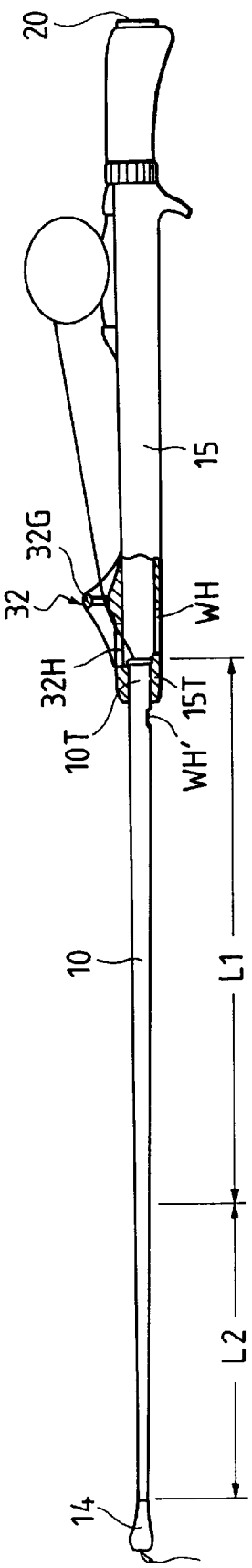
FIG. 15 is a partially sectional, longitudinal view of a fishing rod according to a fourth embodiment of the present invention.
Figure 16:
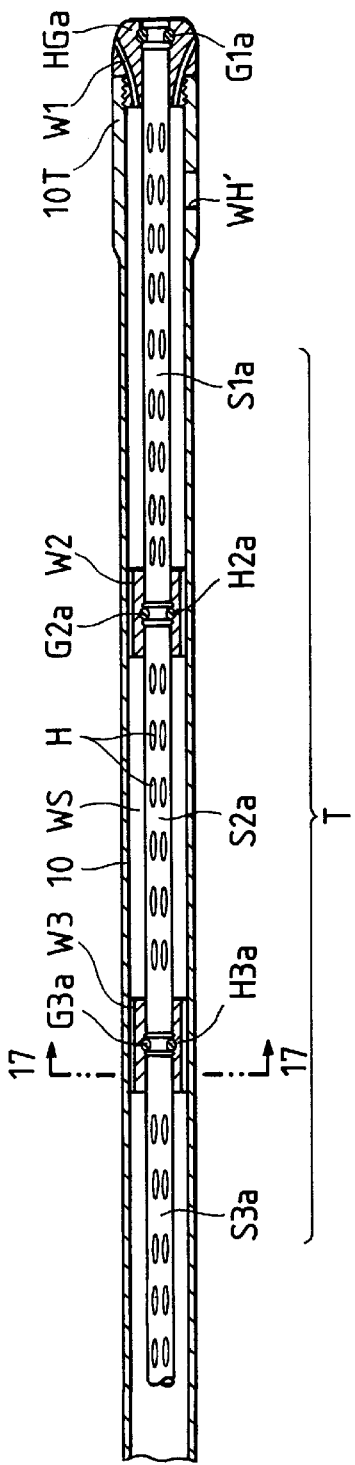
FIG. 16 is a longitudinal section view of the main portions of the fourth embodiment.

FIGS. 15 to 17 show an intra-line fishing rod of two element type according to yet another embodiment of the present invention. The intra-line fishing rod is particularly suitable for use in a lure fishing, and constructed as a telescopic type fishing rod that a tip rod pipe 10 is retained in place on the butt rod pipe 15 by tight fitting a connecting portion 10T of the tip rod pipe 10 to a connecting portion 15T of the butt rod pipe 15 in use, and the tip rod pipe 10 can be retracted into the butt rod pipe 15 for the carrying or portable purpose. An end cap 20 is removably fitted onto a butt end of the butt rod pipe 15, so that the tip rod pipe 10 can be taken out from the inside of the butt rod pipe 15 when the end cap 20 is removed from the butt rod pipe 15. In FIG. 15, reference numeral 32 designates a fishing line introducing guide having a ceramic guide ring 32G for guiding and introducing a fishing line into the butt and tip rod pipes 15 and 10 through an introducing hole 32H formed in the butt rod pipe 15.

FIG. 16 is a longitudinally sectional view showing a portion of the tip rod pipe 10 of the intra-line fishing rod shown in FIG. 15, in which a plurality of support members S1a, S2a and S3a and hold members H2a and H3a are retained within the interior tubular surface of the tip rod pipe 10. The support members S1a, S2a and S3a and the hold members H2a and H3a, before being assembled into the tip rod pipe 10, can be coupled together to form an interior tubular body T. When a hold member HGa for supporting a rear end of the interior tubular body T is threadingly engaged with a female thread on the interior surface of the connecting portion 10T after the interior tubular body T has been inserted into the tip rod pipe 10, the interior tubular body T is secured along the longitudinal axis with respect to the tip rod pipe 10 such that the hold members H2a and H3a are brought into contact with the interior surface of the tip rod pipe 10 to prevent rattling of the tubular body T while the support members S1a, S2a and S3a are kept away from the interior surface to form annular spaces WS. The hold member HGa is made of resin and is provided with a ceramic guide ring G1a fixed thereto.

Each of the support members S1a, S2a ad S3a is formed with a large number of water drain holes H, through which water removed from a fishing line passing through the inside of the tubular body T can be discharged from the inside of the tubular body T to the annular space WS. Each of the hold members H2a and H3a holds a ceramic guide ring G2a, G3a on its internal surface so as to locate the guide ring between adjacent two support members. The guide ring G2a, G3a is designed to have an internal diameter smaller than internal diameters of opposite portions of the adjacent support members. Therefore, when the fishing line is passed through the inside of the tubular body T during fishing, the fishing line is smoothly guided by the ceramic guide rings G2a and G3a with no water or water drop remaining in the inside of the tubular body T, whereby the resistance on the fishing line is greatly reduced. The hold members HGa, H2a and H3a are respectively formed with water path holes W1, W2 and W3 which communicate the annular spaces WS together so that the water entering the annular spaces WS is allowed to flow rearwardly in the tip rod pipe 10 and discharged out of the tip rod pipe 10 through a water discharge hole WH,' and further communicate the annular spaces WS with the inside of the butt rod pipe 15 so that the water is discharged rearwardly behind the hold member HG through the water path holes W3 and out of the fishing rod through a water discharge hole WH formed in a forward end portion of the butt rod pipe 15. The water may be discharged out of the fishing rod through a top guide 14 provided on a tip of the rod pipe 10.

The interior tubular body T may be formed from fiber reinforced resin as similarly to the tip and butt rod pipes 10 and 15, or synthetic resin, or other materials. Since the flexural rigidity of the tip rod pipe 10 is increased if the interior tubular body T is inserted into the tip rod pipe 10, the following arrangement can be made: In case where the interior tubular body T is not extended over the entire length of the tip rod pipe 10 but is disposed only in a portion of the tip rod pipe 10 (for instance, in a portion indicated by Li in FIG. 15), the flexibility of the other forward end portion (indicated by L2 in FIG. 15) is maintained soft as it is, so that the resultant fishing rod becomes a forward bent type fishing rod wherein the bending point of the fishing rod is located at a relatively forward portion of the fishing rod. As a modification of the tip rod pipe 10, there is a case that a portion of the tip rod pipe from a butt end to a middle is formed as a tapered configuration whereas the rest of the tip rod pipe from the middle to a tip end is made straight. In this case, the resultant fishing rod becomes a forward bent type fishing rod where the flexural rigidity of the fishing rod up to the middle is relatively high and the rest of the rod from the middle to the tip end is relatively low. Therefore, it is preferable for such a fishing rod that the interior tubular body T is inserted into and disposed in the tip rod pipe up to the junction between the straight portion and the tapered portion so as not to greatly change the characteristic of the forward bent type fishing rod.

In case where the interior tubular body T is provided in the area of L1, the interior tubular surface of the area L2 may be formed into a smooth corrugated configuration at the time the tip rod pipe 10 is molded. The corrugation on the interior tubular surface of the area L2 can provides the following effect: That is, the water adhered to the fishing rod is wiped out therefrom by protruded portion of the corrugation, and the water thus wiped is temporarily stored in the recessed portion of the corrugation without the contact between the water and the fishing line. In order to prevent the re-adhesion of the water onto the fishing rod, it is sufficient to discharge the temporarily stored water out of the fishing rod through the tip guide 14 sometimes. If fluorineresin is coated on the surface of the corrugation, the slippage of the fishing line can be enhanced and the water discharge can be made smoothly.

Figure 18:
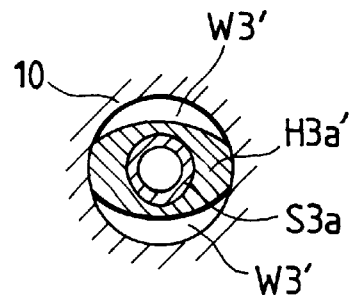
FIG. 18 is a cross-sectional view of the main portions of a variation of a fishing rod according to the fourth embodiment.

Although a cross-section of the hold member H3a is only shown in FIG. 17, the other hold member H2a is similar in configuration to the hold member H3a. Other than the configuration shown in FIG. 17, the outer periphery of the hold member H2a may present an oval shape to define water path holes W3' between the hold member H2a and the interior surface of the tip rod pipe 10 as shown in FIG. 18. It is preferable that the interior surface of the tip rod pipe 10 is formed to have a certain degree of wettability so that the water dropped through the water drain holes H of the interior tubular body is spread over and adhered to the interior surface of the tip rod pipe 10 and is prevented from entering again into the inside of the interior tubular body T. As to the preferable material which can exhibit the wettability, there exist gold, silver, lead and so on, which can be vapor-deposited on the surface. Forming the surface as a minute rough surface can enhance the effect of the wettability while suppressing the weight increase. A rough fluorine-resin surface is also wettable.

The water drain holes H may be formed simultaneously with or after the molding of the resin pipe as in the above embodiment. Alternatively, in order to form the water drain holes in the tubular body T, a process that a wire-like member is spirally wound to provide the interior tubular body with the spiral clearance be used as water drain holes, a process that a net-like member is formed into a cylindrical form to provide the interior tubular body with nets or meshes of the net-like member be used as the water drain holes, or the like is employable. If the water drain hole is too large in size, a disadvantage may arise in that a fishing line passing tool is hardly passed through the inside of the interior tubular body, or a fishing line dangles through the hole, so that water in the space WS is likely to be adhered to the fishing line again. Thus, the dimension of the water drain hole is properly selected to remove such a disadvantage. Note however that if the dimension is too small, the water is likely to remain in the inside of the interior tubular body due to its surface tension, which leads another disadvantage.

Therefore, a thin slit hole extending in the longitudinal direction of the interior tubular body T or extending spirally with respect to the longitudinal direction of the interior tubular body T, the shape of which is similar to what is made by cutting the tubular body with a knife, and the width of which is less than 1 mm (preferably within a range from 0.1 to 0.5 mm) is preferable since such thin slit hole can effectively discharge the water out of the interior tubular body into the space WS with the aid of the capillary tube effect.

Further, in order to enable the adjustment of the flexural rigidity of the tip rod pipe 10, the cross-section of the interior tubular body T may be formed as an incomplete circular shape such as a oval shape, or the water drain holes H may be arranged non-uniformly in the circumferential direction thereof. That is, in the latter case, if the large number of the water drain holes are arranged at lateral portions of the interior tubular body T rather than vertical portions thereof in the cross-section when the tip rod pipe 10 supporting the interior tubular body T is retained on the butt rod pipe 15, the flexural rigidity of the tip rod pipe 10 in the vertical direction is lowered in comparison with that in the lateral direction, so that the fishing rod becomes a relatively soft type fishing rod. In contrast thereto, such interior tubular body T is oriented at 90° and retained in that state in the tip rod pipe 10, the fishing rod can be used as a relatively hard type fishing rod. In addition, the provision of markers on the interior tubular body T and the tip rod pipe 10 usable for the mutual circumferential alignment in assembling them, and a marker on the butt rod pipe 15 usable for the mutual circumferential alignment between the assembly and the butt rod pipe 15 eases the adjustment of the circumferential orientation of the interior tubular body with respect to the fishing rod, and thus the fishing rod having a desired softness or hardness can be easily obtained.

What is claimed is:

1. An intra-line fishing rod comprising a rod pipe having a longitudinal axis and an interior tubular surface surrounding the longitudinal axis, the fishing rod comprising:
   at least one fishing line guide member retained within the interior tubular surface;
   at least one support member retained within the interior tubular surface and extending along the longitudinal axis, said at least one support member positioning and retaining said at least one fishing line guide member with respect to the rod pipe; and,
   means for securing said at least one fishing line guide member and said at least one support member along the longitudinal axis with respect to the rod pipe; and
   at least one holding member respectively secured to each of said at least one fishing line guide members, said at least one holding member is contiguously positioned at an axially end of said at least one support member;
   wherein said at least one fishing line guide member and said at least one support member are routinely removable from the rod pipe upon disengaging said means for securing with respect to the rod pipe.

2. The fishing rod according to claim 1, wherein said at least one holding member is axially interposed between two said at least one support members.

3. The fishing rod according to claim 1, further comprising:
   radial clearance means for absorbing looseness between said at least one holding member and the rod pipe in a radial direction with respect to said longitudinal axis.

4. The fishing rod according to claim 1, further comprising:

longitudinal clearance means for absorbing looseness between said at least one holding member and said at least one support member in along said longitudinal axis.

5. An intra-line fishing rod comprising a rod pipe having a longitudinal axis and an interior tubular surface surrounding the longitudinal axis, the fishing rod comprising:
at least one fishing line guide member retained within the interior tubular surface;
at least one support member retained within the interior tubular surface and extending along the longitudinal axis, said at least one support member positioning and retaining said at least one fishing line guide member with respect to the rod pipe; and,
means for securing said at least one fishing line guide member and said at least one support member along the longitudinal axis with respect to the rod pipe;
wherein said at least one fishing line guide member and said at least one support member are routinely removable from the rod pipe upon disengaging said means for securing with respect to the rod pipe, and said at least one support member is radially expanded so as to be retained within the interior tubular surface, said at least one support member is radially contracted by contact with the interior tubular surface.

6. An intra-line fishing rod comprising a rod pipe having a longitudinal axis and an interior tubular surface surrounding the longitudinal axis, the fishing rod comprising:
at least one fishing line guide member retained within the interior tubular surface;
at least one support member retained within the interior tubular surface and extending along the longitudinal axis, said at least one support member positioning and retaining said at least one fishing line guide member with respect to the rod pipe; and,
means for securing said at least one fishing line guide member and said at least one support member along the longitudinal axis with respect to the rod pipe; and
means for maintaining two said at least one support members axially contiguous with one another;
wherein said at least one fishing line guide member and said at least one support member are routinely removable from the rod pipe upon disengaging said means for securing with respect to the rod pipe, and said means for maintaining permits said two at least one support members to relatively rotate with respect to one another about the longitudinal axis.

7. An intra-line fishing rod comprising a rod pipe having a longitudinal axis and an interior tubular surface surrounding the longitudinal axis, the fishing rod comprising:
at least one fishing line guide member retained within the interior tubular surface;
at least one support member retained within the interior tubular surface and extending along the longitudinal axis, said at least one support member positioning and retaining said at least one fishing line guide member with respect to the rod pipe; and,
means for securing said at least one fishing line guide member and said at least one support member along the longitudinal axis with respect to the rod pipe;
wherein said at least one fishing line guide member and said at least one support member are routinely removable from the rod pipe upon disengaging said means for securing with respect to the rod pipe, and said at least one support member includes an internal peripheral surface which extends substantially parallel to the interior tubular surface, and at least one longitudinally extending opening revealing said internal peripheral surface.

8. The fishing rod according to claim 7, further comprising:
at least one partial annular fishing line guide member secured to said internal peripheral surface opposite said at least one longitudinally extending opening;
wherein said at least one partial annular fishing line guide member is oriented with respect to the rod pipe so as to be located along a minimal radius of curvature when the rod pipe is bent during fishing.

9. The fishing rod according to claim 7, further comprising:
a plurality of said at least one longitudinally extending openings axially spaced with respect to one another; and,
an annular one of said at least one fishing line guide members secured to said internal peripheral surface between a pair of said plurality of said at least one longitudinally extending openings.

10. An intra-line fishing rod comprising a rod pipe having a longitudinal axis and an interior tubular surface surrounding the longitudinal axis, the fishing rod comprising:
at least one fishing line guide member retained within the interior tubular surface;
at least one support member retained within the interior tubular surface and extending along the longitudinal axis, said at least one support member positioning and retaining said at least one fishing line guide member with respect to the rod pipe; and,
means for securing said at least one fishing line guide member and said at least one support member along the longitudinal axis with respect to the rod pipe;
wherein said at least one fishing line guide member and said at least one support member are routinely removable from the rod pipe upon disengaging said means for securing with respect to the rod pipe, said means for securing includes a holding member secured to an axial end of the rod pipe, and said holding member is threadably secured to the interior tubular surface.

11. An intra-line fishing rod comprising a rod pipe having a longitudinal axis and an interior tubular surface surrounding the longitudinal axis, the fishing rod comprising:
at least one fishing line guide member retained within the interior tubular surface;
at least one support member retained within the interior tubular surface and extending along the longitudinal axis, said at least one support member positioning and retaining said at least one fishing line guide member with respect to the rod pipe; and,
means for securing said at least one fishing line guide member and said at least one support member along the longitudinal axis with respect to the rod pipe;
wherein said at least one fishing line guide member and said at least one support member are routinely removable from the rod pipe upon disengaging said means for securing with respect to the rod pipe, said means for securing includes a holding member secured to an axial end of the rod pipe, and said holding member includes an annular groove receiving at least one radially directed projection from said at least one support member, said holding member and said at least one support member are relatively rotatable with respect to another about the longitudinal axis.

12. The fishing rod according to claim 11, wherein said at least one support member includes at least one longitudinally oriented slit interposed between pairs of said at least one radially directed projections, said at least one longitudinally oriented slit extends from an axial end of said at least one support member proximate to said axial end of the rod pipe.

13. An intra-line fishing rod comprising a rod pipe having a longitudinal axis and an interior tubular surface surrounding the longitudinal axis, the fishing rod comprising:

at least one fishing line guide member retained within the interior tubular surface;

at least one support member retained within the interior tubular surface and extending along the longitudinal axis, said at least one support member positioning and retaining said at least one fishing line guide member with respect to the rod pipe; and, means for securing said at least one fishing line guide member and said at least one support member along the longitudinal axis with respect to the rod pipe;

wherein said at least one fishing line guide member and said at least one support member are routinely removable from the rod pipe upon disengaging said means for securing with respect to the rod pipe, said at least one support member includes a plurality of longitudinally extending rods, and said at least one fishing line guide member is retained by a plurality of bends in each of said plurality of longitudinally extending rods.

14. An intra-line fishing rod comprising a rod pipe having a longitudinal axis and an interior tubular surface surrounding the longitudinal axis, the fishing rod comprising:

at least one fishing line guide member retained within the interior tubular surface;

at least one support member retained within the interior tubular surface and extending along the longitudinal axis, said at least one support member positioning and retaining said at least one fishing line guide member with respect to the rod pipe;

means for securing said at least one fishing line guide member and said at least one support member along the longitudinal axis with respect to the rod pipe; and, a pair of annular plates on either side of said at least one fishing line guide member;

wherein said at least one fishing line guide member and said at least one support member are routinely removable from the rod give upon disengaging said means for securing with respect to the rod pipe, and said securing means is contained within said rod pipe when securing said at least one fishing line guide member, said means for securing includes a holding member secured to an axial end of the rod pipe, said at least one support member includes a plurality of longitudinally extending rods.

15. An intra-line fishing rod comprising a rod pipe having a longitudinal axis and an interior tubular surface surrounding the longitudinal axis, the fishing rod comprising:

at least one fishing line guide member retained within the interior tubular surface;

at least one support member retained within the interior tubular surface and extending along the longitudinal axis, said at least one support member positioning and retaining said at least one fishing line guide member with respect to the rod pipe;

means for securing said at least one fishing line guide member and said at least one support member along the longitudinal axis with respect to the rod pipe; and, pivot means for folding each of said plurality of longitudinally extending rods;

wherein said at least one fishing line guide member and said at least one support member are routinely removable from the rod pipe upon disengaging said means for securing with respect to the rod pipe, and said securing means is contained within said rod pipe when securing said at least one fishing line guide member, said means for securing includes a holding member secured to an axial end of the rod pipe, said at least one support member includes a plurality of longitudinally extending rods.

* * * * *